Patented Aug. 31, 1943

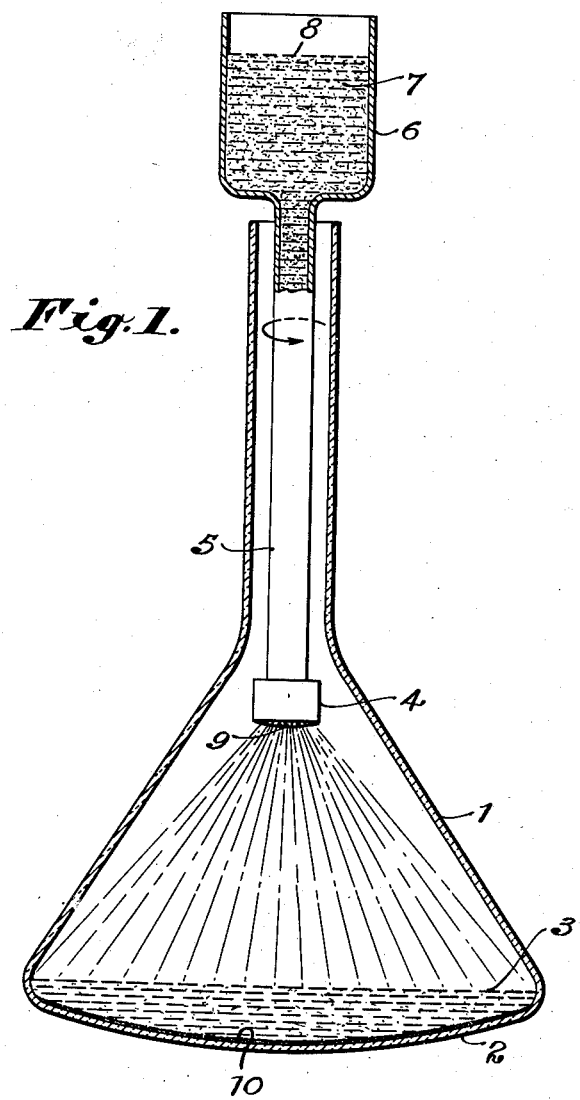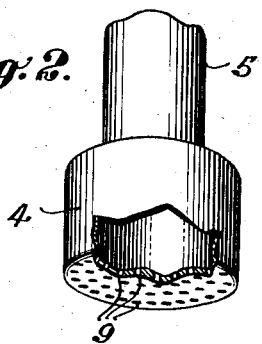

2,328,292

UNITED STATES PATENT OFFICE 2,328,292

METHOD OF DEPOSITING PHOSPHOR MATERIALS

William H. Painter, Short Hills, N. J., assignor to Radio Corporation of America, a corporation of Delaware Application December 19, 1941, Serial No. 423,643

9 Claims. (Cl. 117—34)

My invention relates to processing of cathode ray tubes and particularly to methods of depositing phosphor materials in cathode ray tube screen manufacture.

The technique of settling phosphor materials for cathode ray tube screen manufacture comprises, in essence, suspending the powdered phosphor material in a liquid in a bulb container, such as a tube envelope, allowing the material to settle through the liquid and upon the surface of the bulb, and then decanting the liquid. To obtain uniformity sufficient for use of the settled material as a screen in television or oscillograph tubes, the powdered material must be homogeneously distributed throughout the suspending medium at the beginning of the settling cycle. This distribution has usually been achieved by shaking the suspension vigorously after it has been introduced in the bulb to which the screen is to be applied. This method frequently has some undesirable features. For example, where several bulbs are to be placed on a single platform for decanting, the jarring attendant upon fastening a bulb to the platform may disturb previously set bulbs. Particularly in the case of settling multiple-layer screens, it is usually difficult or impossible to thoroughly shake the material for a second or third layer without disturbing the first layer.

Furthermore, in depositing phosphor materials to form screens of large particle size and particularly when two or more layer screens are being made, conventional methods of decanting the liquid by tilting the bulb have been found unsatisfactory. Thus parts of the screen usually slide or avalanche as the angle between the horizontal and the surface of the screen or bulb wall increases.

It is an object of my invention to provide an improved method of manufacturing phosphor screens. It is another object to provide a method of settling phosphor materials from a liquid suspension whereby uniform phosphor screens may be obtained. It is a further object to provide a method of settling phosphors from a liquid suspension to obtain multiple-layer screens without danger of avalanching. A further object is to provide an improved method of forming a plurality of phosphor layers without disturbing previously formed layers.

In accordance with my invention I deposit a finely divided phosphor material on a screen foundation such as the end wall of a bulb or other container by distributing a suspension of the phosphor material over the surface of a quantity of liquid contained within the bulb or container and allow the material in the suspension to fall through the liquid into contact with the container to form a layer or screen of phosphor material. Additional layers of the same or different phosphor material may be formed in accordance with my invention and in similar manner without harmful agitation of the liquid in the container between the application of the additional layers. Further in accordance with my invention I slowly decant the liquid from the container and simultaneously dry the deposited phosphor material while maintaining conditions such that sliding or avalanching does not occur. These and other objects, features and advantages of my invention will become apparent when considered in view of the following description and the accompanying drawing wherein:

Figure 1 shows an apparatus suitable for practicing a portion of my method, and

Figure 2 shows in enlarged detail a portion of the apparatus shown in Figure 1.

Referring to Figure 1, I have shown a cathode ray tube envelope or bulb 1 having an end wall 2 on the inner surface of which it is desired to form a luminescent phosphor screen. The end wall 2 may be flat or shaped as a spherical surface of varying curvature to better withstand atmospheric pressure to which it is subjected after the evacuation of the bulb during cathode ray tube manufacture. It has been customary to deposit various phosphor materials from a liquid suspension by introducing the suspension into the bulb in contact with the end wall 2 and allowing the phosphor material in the suspension to settle by gravitational forces into contact with the end wall without disturbing or jarring the bulb during the settling process. Following admission of the suspension into the bulb it has been customary to thoroughly shake the bulb and thus agitate the suspension so that the phosphor material is uniformly distributed throughout the volume of the suspension. Such a process, however, is not suitable where a number of bulbs are being provided with luminescent screens simultaneously due to the fact that each must be agitated, and when positioned on a multiple-unit decanting rack containing other bulbs in process of settling, the other bulbs are usually disturbed so that the phosphor material settles unevenly.

In accordance with my invention, however, I introduce a quantity of clear liquid, that is, a liquid without any suspended phosphor material therein and distribute over the surface of this liquid a liquid suspension containing the phosphor material to be deposited by settling. I have found that if the suspension is poured into a dry bulb, the initial impact of the liquid against the dry bulb will result in splashing which is likely to leave areas of uneven thickness in the finished screen. Furthermore, if the suspension is poured into a dry bulb only partially processed and containing a previously deposited screen of luminescent material, the splashing results in washing off portions of the previously deposited screen material. Therefore in accordance with my invention and prior to the introduction of a suspension of phosphor material into the bulb, I cover the surface of the bulb face with a liquid to a depth of at least ½ inch or more to act as a cushion. I then spray the surface of the cushioning liquid with the suspension either as fine streams or as a fine mist. Furthermore, during the application of the suspension to the surface of the cushioning liquid I vary the points of impact between the introduced suspension and the cushioning liquid.

Referring again to Figure 1, the end wall 2 of the bulb 1 is covered by a liquid 3, such as water, to a depth of at least ½ inch to act as a cushion to the liquid, such as water, carrying in suspension the phosphor material to be deposited by settling. A convenient apparatus for introducing the suspension is shown in Figure 1 and comprises an elongated funnel having a nozzle portion 4, a neck portion 5 and a reservoir 6. The nozzle and neck portions of the funnel are of sufficiently small diameter to fit within the neck of the bulb, and the nozzle is inserted into the bulb neck with its apertured end portion 3 to 4 inches from the surface of the cushioning liquid 3. The material 7 to be deposited by settling is thoroughly agitated with a liquid, such as the water 8, to provide a suspension of the material in the liquid which is immediately introduced into the reservoir 6 of the funnel shown in Figure 1. The nozzle portion 4 is preferably of convex spherical shape as viewed from the end wall side as shown in Figure 2 and is provided with a number of orifices 9 whose axes are normal to the end surface of the nozzle. The actual distance between the nozzle and the surface of the liquid is such that for any particular orifice size and configuration the entire surface of the liquid 3 will receive substantially the same amount of suspension per unit area. Immediately upon introduction of the suspension into the reservoir 6 I rotate the funnel rapidly and continue this rotation as long as the suspension is passing through the orifices. Preferably the funnel is rotated, such as by hand, since if the funnel is held stationary, a concentration of the material will occur adjacent the points of impact of the fine streams of suspension issuing from the nozzle portion of the funnel; whereas by rotating the funnel rapidly as long as the suspension is passing through the orifices greater uniformity of distribution is assured. I have found that it is necessary to maintain sufficient "head" or height of suspension in the funnel to insure a pressure sufficiently great to force the streams through the orifices substantially perpendicular to the surface of the nozzle. If the pressure or head becomes too low, the suspension tends to collect on the surface of the nozzle and falls in large drops, thereby causing splashing and loss of uniformity. To avoid this condition I remove the funnel from the bulb 1 before the height of the liquid 8 reaches a minimum level at which large drops collect on and fall from the nozzle. One funnel which I have found particularly satisfactory for use in making 7 to 12-inch diameter screens is provided with a neck portion 18 inches in length, the nozzle having 30 orifices, each 0.013 to 0.014 inch in diameter. With this funnel, dripping occurs when the head falls to less than 16 inches and under proper head the nozzle passes the suspension at a rate of 11.8 c. c. per second.

During the introduction of the suspension and following such introduction by a period of time sufficient to allow substantially all of the phosphor particles to settle through the liquid 3 into contact with the end wall 2 to form the screen 10, I maintain the bulb 1 and the cushioning liquid 3 in a state of rest, that is, unagitated so that the particles introduced in the suspension fall through the cushioning liquid 3 without being disturbed, depending entirely upon induced convection and on the distribution of the suspension on the surface of the liquid 3 for proper distribution of the phosphor material over the end wall 2. Obviously, the liquid suspending the phosphor material and the cushioning liquid through which the suspended material falls must be mixable and may be the same, such as water, although for certain applications and particularly where large phosphor particle size material is used, these liquids may be such as to vaporize more rapidly than water. Thus liquids such as ether or carbon disulphide may be used as the suspending medium and as the cushioning liquid through which the particles settle. Following the settling of the phosphor material, I remove the liquid preferably by tilting and siphoning the liquid away from the deposited material as described more particularly below.

It will be appreciated that my method of depositing phosphor materials by settling is of particular advantage where cascade screens comprising two or more layers of different phosphor materials are desired. Such layers are of particular advantage where visible light absorption effects are to be controlled as disclosed by H. W. Leverenz in his U. S. Patent No. 2,243,828. Following the application of a screen 10 by settling as described above, and prior to the removal of the cushioning liquid through which the material of the screen 10 has been settled, I distribute over the exposed surface of the cushioning liquid additional phosphor material preferably in a liquid suspension to form a second phosphor layer by a settling of the additional material into contact with or to a position where it is supported by the screen 10. Since the screen has already been deposited, the material to form the second layer is poured in suspension form into the funnel as before, following its insertion in the bulb 1. However, and especially if dripping from the nozzle is to be prevented, the funnel may be filled to a point which will give sufficient head to prevent dripping with a clear liquid similar to the cushioning liquid, followed by introduction of the neck and nozzle portions into the bulb 1 and by the introduction of the suspension into the funnel. The funnel is removed prior to a time at which dripping occurs, as in the case of introducing the first suspension. After the desired amount of suspension has been added, the head or the pressure at the nozzle may be maintained by clear liquid until all of the suspension has passed through the nozzle, whereupon the funnel is removed prior to the occurrence of dripping. The phosphor material is then allowed to settle through the cushioning liquid as before without removal of the cushioning liquid between the two settling steps. Any additional layers of phosphor material may be deposited in a similar manner. Thus the same liquid in contact with the bulb and the wall is used for settling each layer of the screen, and the bulb need not be subjected to any agitation between the two settling steps. Furthermore, for multi-layer screens having more than two layers of phosphor materials, all of the different materials may be deposited in any desired sequence without disturbing the previously successively deposited layers.

I have found that when I remove the liquid from the bulb I such as by siphoning and tilting the bulb, parts of the screen may slide or avalanche, leaving a screen of nonuniform thickness or areas of the bulb wall which are entirely clear of the phosphor material. Furthermore, I have found that following the application of a number of screen layers without removal of the cushioning liquid or substantial agitation between the application of the individual layers, the screen material has a lower tendency to slide or avalanche. Such a tendency is reduced in accordance with a further teaching of my invention involving siphoning the liquid from the bulb and simultaneously drying the settled phosphor material while maintaining the angle between the horizontal and the bulb wall below a critical maximum angle. I have found that the sliding or avalanching mentioned above occurs generally only on those areas of the screen which are wet. The critical angle for such sliding or avalanching of phosphor materials having a particle size of 1 to 10 microns and aggregates of 40 to 60 microns is about 5 to 10 degrees for G-12 and Nonex glass and 10 to 15 degrees for Pyrex glass. My method is equally suitable for depositing phosphor materials on either flat or concave surfaces, and I therefore siphon and tilt the bulb simultaneously at such a rate that the surface of the screen which is covered by the liquid never assumes an angle with the horizontal greater than this critical angle. However, due to the thickness of the settled phosphor material a considerable amount of liquid is usually entrained or held in the space between the phosphor particles, and this liquid tends to run out after the main body of the liquid has been tilted away from the screen. Since the part of the screen holding the liquid in the intervening spaces is usually at an angle greater than the critical angle, the liquid tends to run and cause streaks or sliding and avalanching. To eliminate this difficulty I introduce a stream of warm dry gas such as heated air into the bulb to evaporate the entrained liquid while simultaneously tilting the bulb and maintaining the area of the screen in contact with the main body of the liquid at an angle less than the critical angle. Thus I have found that it is desirable to tilt, siphon and dry simultaneously at such a rate that; first, the part of the screen covered by the liquid never exceeds the critical angle with the horizontal; second, that the edge of the liquid in contact with the screen recedes at a uniform rate, and third, that the screen is substantially dry over the portions thereof which exceed the critical angle of sliding or avalanching.

While I have indicated the preferred embodiments of my invention of which I am now aware and have also indicated only one specific application for which my invention may be employed, it will be apparent that my invention is by no means limited to the exact forms illustrated or the use indicated, but that many variations may be made in the particular structure used and the purpose for which it is employed without departing from the scope of my invention as set forth in the appended claims.

I claim:

1. The method of making a luminescent screen comprising the steps of covering a substantially horizontal foundation with a cushioning liquid, distributing a phosphor material over the exposed surface of said cushioning liquid, maintaining said foundation and said liquid in an unagitated condition until said phosphor material settles into contact with said foundation and removing the cushioning liquid from contact with the settled phosphor material.

2. The method of making a luminescent screen comprising the steps of distributing a wet phosphor material over the surface of a liquid on a screen foundation, maintaining said foundation and said liquid in an unagitated condition until the phosphor material falls through the depth of said liquid by gravitational force, terminating the fall of said material on the screen foundation and removing said liquid from said foundation.

3. The method of making a luminescent screen comprising covering a screen foundation member with a clear liquid, positioning said member horizontally, distributing a phosphor substantially uniformly over the exposed surface of the clear liquid, maintaining said foundation in a substantially horizontal position until said phosphor has settled through said liquid into contact with said member, and removing the liquid from said foundation.

4. The method of making a luminescent screen comprising covering a screen foundation with a clear liquid, successively distributing phosphor materials over the surface of said liquid while said foundation is in a substantially horizontal position, maintaining said foundation substantially horizontal until the phosphor last distributed over the said liquid has settled into a position where it is supported by said foundation, and removing the liquid from said foundation.

5. The method of making a luminescent screen comprising covering a substantially horizontally disposed screen foundation with a cushioning liquid, distributing a second liquid carrying a phosphor in suspension over the exposed surface of the cushioning liquid, maintaining said foundation in a horizontal position for a length of time sufficient to allow said phosphor to settle through said liquid into contact with said foundation, and removing said liquids from said foundation.

6. The method as claimed in claim 5 wherein said cushioning liquid and said second liquid are of the same composition.

7. The method of making a luminescent screen comprising the steps of distributing a phosphor material over the surface of a liquid, allowing said material to settle through said liquid, interrupting the settling of said material on a substantially horizontal screen foundation, gradually tipping said foundation to cause said liquid to flow from the surface thereof and simultaneously removing said liquid and drying said foundation, the rate of tipping and drying being such that the areas inclined at an angle to the horizontal greater than 15 degrees are dry.

8. The method of making a luminescent screen comprising the steps of distributing a liquid suspension of a phosphor material over the surface of a clear liquid, maintaining said clear liquid in a state of rest to allow the phosphor to settle through said liquid under gravitational forces, terminating the fall of said particles on a concave foundation surface to form a layer of phosphor on said surface, distributing a second suspension of a second phosphor material over the surface of said clear liquid, again maintaining said clear liquid in a state of rest to allow the said second phosphor to settle through said liquid, interrupting the fall of said second phosphor on said layer of phosphor and simultaneously tipping and drying said foundation at a rate such that said layers remain on said foundation.

9. The method of depositing a phosphor on the inner end wall of a cathode ray tube envelope comprising admitting liquid to substantially cover the end wall of the envelope when said envelope is in an inverted vertical position with said end wall substantially horizontal, depositing on the exposed surface of said liquid a suspension of luminescent material in a liquid mixable with said admitted liquid, maintaining said envelope and said liquid substantially unagitated until the luminescent material settles on the end wall of said envelope, tilting said envelope from its vertical position and simultaneously removing said liquid and drying the luminescent material on said end wall at a rate at which the luminescent material inclined to the horizontal by an angle greater than 15° is substantially dry whereby slipping of said luminescent material on said end wall does not occur.

WILLIAM H. PAINTER.